United States Patent [19]

Lambert

[11] Patent Number: 5,299,782
[45] Date of Patent: Apr. 5, 1994

[54] RETRACTABLE PROTECTION NET ASSEMBLY

[76] Inventor: William S. Lambert, 52 Tokalon, Metaire, La. 70001

[21] Appl. No.: 928,995

[22] Filed: Aug. 12, 1992

Related U.S. Application Data

[63] Continuation-in-part of Ser. No. 681,160, Apr. 5, 1991, abandoned.

[51] Int. Cl.⁵ .............................................. E04H 17/00
[52] U.S. Cl. .......................................... 256/45; 256/1; 256/25; 405/128
[58] Field of Search .................. 256/1, 25, 45; 52/3–5; 47/28.1; 135/87, 115, 119; 273/27; 150/154; 206/525; 220/484

[56] References Cited

U.S. PATENT DOCUMENTS

| | | | |
|---|---|---|---|
| 364,175 | 5/1887 | Hurd | 256/1 |
| 1,966,687 | 7/1934 | Scott | 273/27 |
| 2,501,762 | 3/1950 | Davis | 220/484 |
| 2,660,186 | 11/1953 | Marshall | 135/87 |
| 3,259,173 | 7/1966 | Manning | 150/154 |
| 3,924,913 | 12/1975 | Cooper | 256/25 |
| 4,775,066 | 10/1988 | Keppeler | 220/484 |

FOREIGN PATENT DOCUMENTS

| | | | |
|---|---|---|---|
| 232255 | 3/1964 | Australia | 52/4 |
| WO88/04715 | 6/1988 | PCT Int'l Appl. | |
| 458563 | 12/1936 | United Kingdom | 256/1 |

Primary Examiner—Randolph A. Reese
Assistant Examiner—Anthony Knight

[57] ABSTRACT

An underground housing contains a netting that is retractably attached inside the housing. The netting is used to cover rubbish positioned at curbside, to keep dogs and children away from the rubbish. The netting also acts to hide the rubbish until it is picked up.

2 Claims, 3 Drawing Sheets

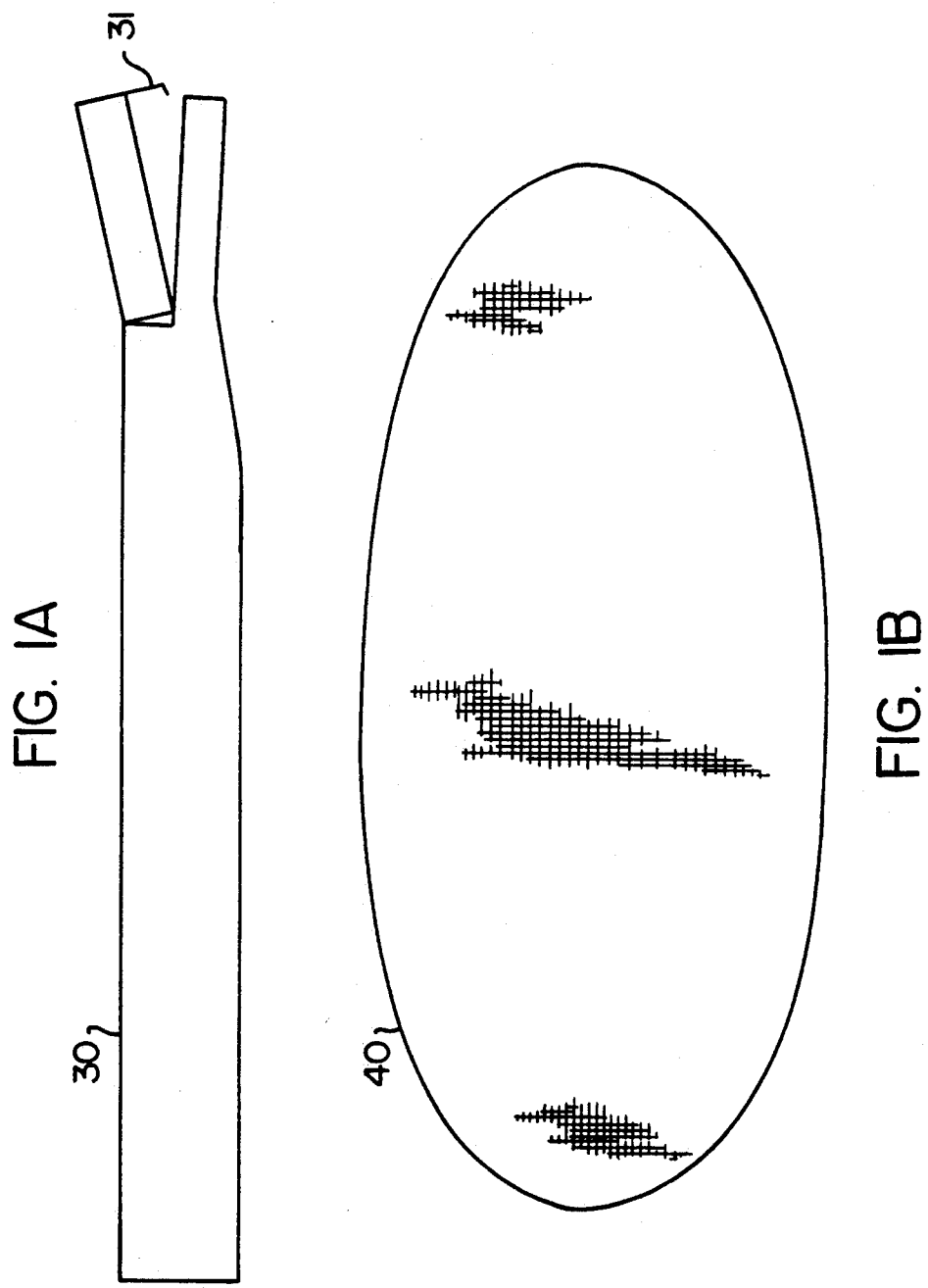

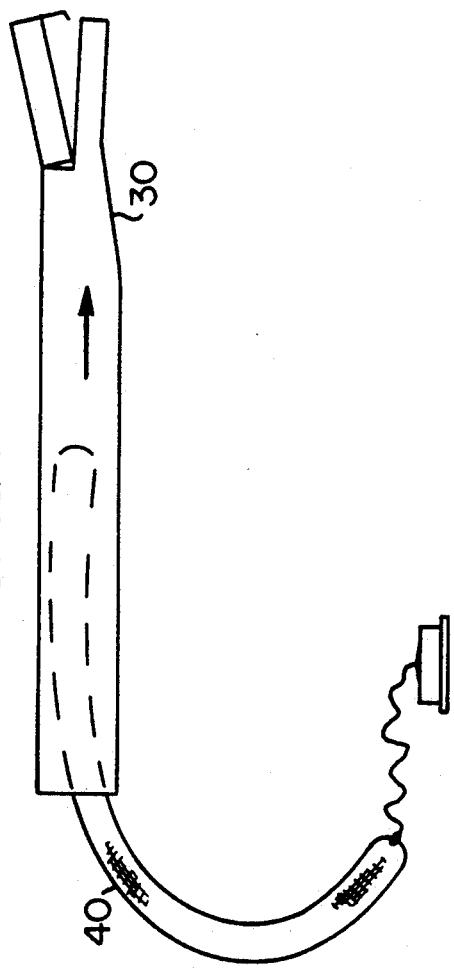
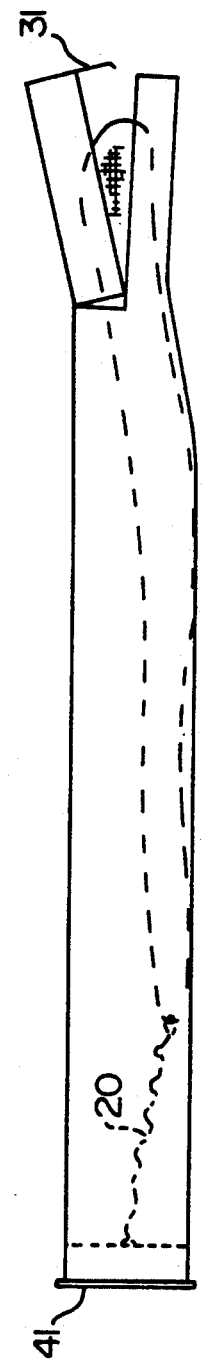
FIG. 2A
FIG. 2B

RETRACTABLE PROTECTION NET ASSEMBLY

CROSS-REFERENCES TO RELATED APPLICATIONS

This application is a continuation-in-part of application Ser. No. 07/681,160, filed Apr. 5, 1991, now abandoned.

BACKGROUND—FIELD OF INVENTION

A critical ingredient in community waste programs is proper segregation/preparation packaging of the waste materials for curbside collection. Outdoor placement of any such recycling collectables still-retaining or suggesting a food odor can invite scavenging animals, or, the items themselves can be an irresistible object of interest to curious children. Efficient tamper-proofing measures of some citizens such as, walls, fence/gates, eternally-residual boxes, platforms, etc., have met with minimal success. Retractably removed from underground storage, net protectively encompasses and tamper-proofs the waste placement until collected. With application of the instant invention to waste collection, no reminder of unsightly garbage necessarily remains all day(s) to mar(i.e., empty cans, bins, bags, boxes, etc.) the visual ambiance.

SUMMARY OF THE INVENTION

This invention provides a self-retracting, high-strength netting to protectively encompass said collectables articles. Through a ground-surface door, this net is extended, drawn out and over collectables. Upon collection pickup, the net automatically recoils/returns through said door/housing, and back down into the below-ground level, and is concealed in the coiled tubing storage.

In the embodiment preferred, excepting any recoil spring(steel, rubber), the entire unit is totally comprised of stamped, cast, or extruded, retail poly-plastics.

Urban societies are mandating separation-for-curbside-collection of recyclable disposables/collectables (i.e., plastics, papers, glass, etc.), either in separate, say, garbage-type bagging, or in the unsightly, disease-transferring, reuseable containers. Said containers have to be carried out, collected (if not strewn all over lawn the previous night), and back-in (to off-street storage)—residents are, in effect, married to them for life. While this netting could surely protect such containers, the optimum use would be as protection for (suggest "hot") colored coded (i.e., glass, paper, etc.), haul-away biodegradable packages to-be-collected. Once said waste collectables are agency-collected, released netting recoils/withdraws from sight into the was housing. Along with greatly reduced physical and equipment expenditure, contact is minimized regarding disease-spread (say, in Flu season) by collectors hands—just scoop package and roll on. In today's procedure, the collection truck idles-away fuel, waiting, as the collector must "shake-out" and set back down the returnable container—necessitating extra wear and tear (brakes, transmissions), stopping, starting, stopping, starting . . . in lieu of rolling slowly along while the particular packages are snatched up and tossed aboard. Subterraneously located between the curb and sidewalk, normally, the now visually clean, uncluttered yard or curb surface is virtually undisturbed by visual or actual departure from the norm. The average home handyman can purchase the device at a store and install the same himself.

This approach accomplishes the most efficient preservation of partitioned recyclable disposables until collected. When biodegradable, color coded packaging containment is used in concert with this protection for later delineation/assortment at a facility so operated, the production gained by the "rolling" speed of collection, with resultant labor, equipment, fuel, noise, etc. savings, is far superior to the stop-and-shakeout method of the cumbersome, inconvenient "re-usable" containers. In any case, the goal is a more visually acceptable curbside containment/storage—absent any representation as a "waste repository". The minimization of the conditions for disease spread cannot be underappreciated.

BRIEF DESCRIPTION OF THE DRAWINGS

FIG. 1A depicts a length of flexible standard tubing, free-end formed into a hinged entry/exit door. FIG. 1B shows a segment of netting material usable in the tubing shown in FIG. 1A.

FIG. 2A shows the netting being drawn into/thru said tubing. Said bunched netting, its lowermost free edge looped and knotted by/and to, a segment of elastic banding oppositely-anchored at free-end of tubing. FIG. 2B shows the netting of FIG. 1B placed inside of the tubing, and ready for use.

DRAWING REFERENCE NUMERALS

10—coiled tubing, complete-as-a-unit, in-place
20—elastic band/recoil energy
30—standard length flexible tubing of appropriate formulation/dimension.
31—formed, hinged, snap-latchable, netting-exit/entry door of 30
40—appropriately-dimensioned/formulated high-strength netting segment
41—recoil energy band 20 anchor
42—various objects protectable by netting coverage
60—surface level

Figure 3A:
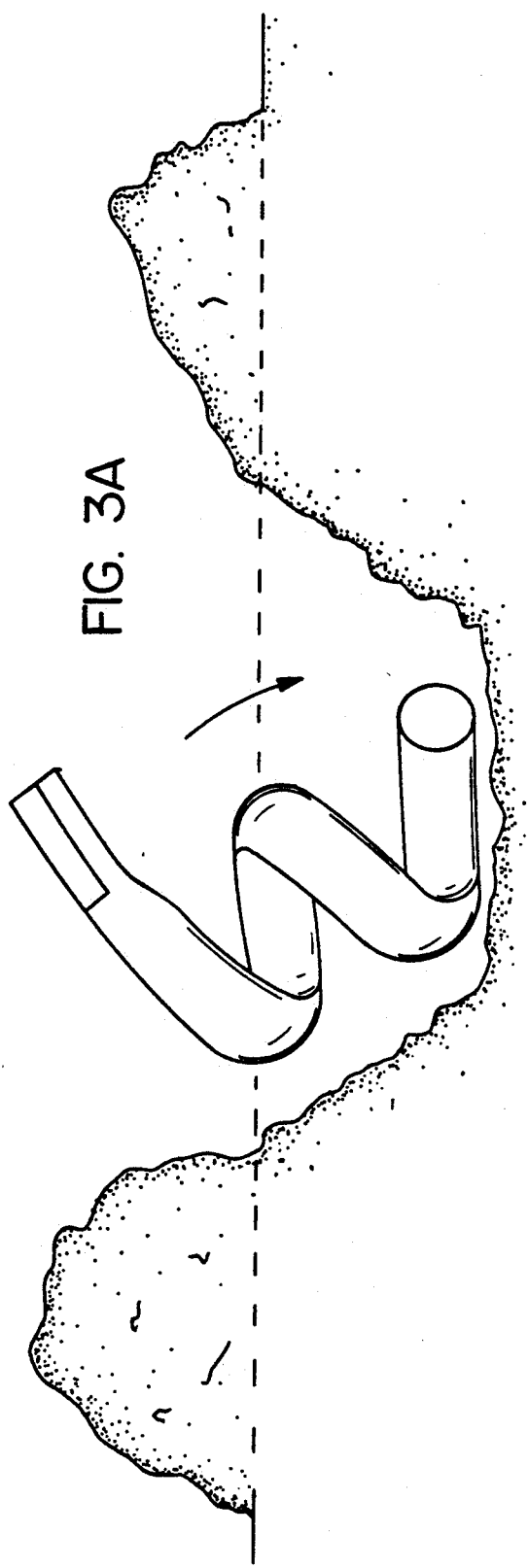
FIG. 3A shows the tubing and netting being installed for use prior to back-filling.
Figure 3B:
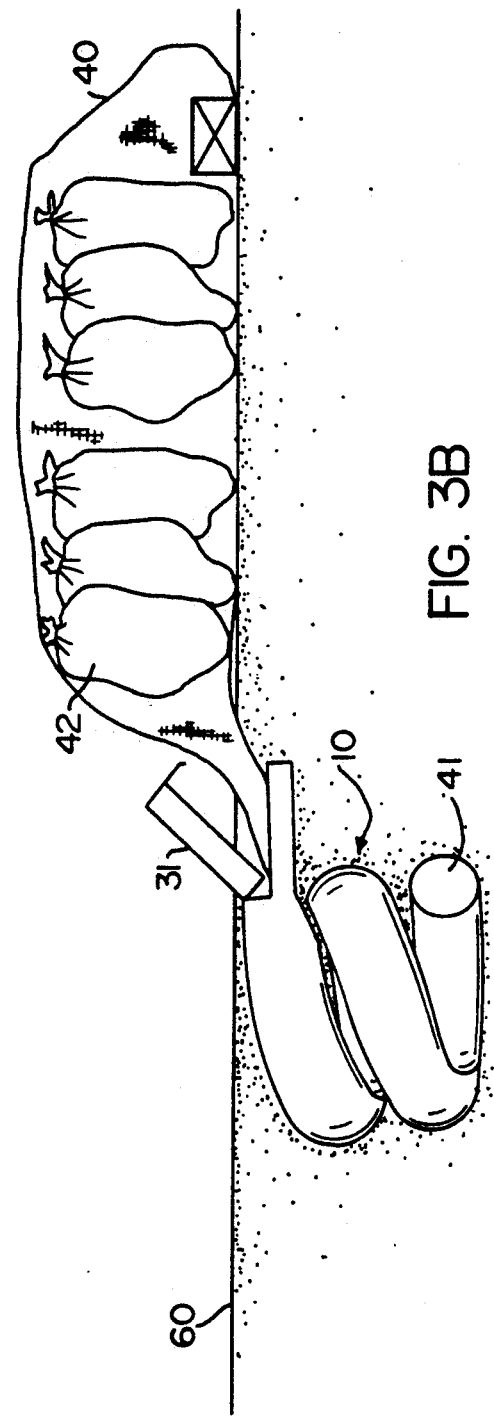
FIG. 3B shows the device of the present invention after back-filling, and with the netting being extended to cover several packages.

DESCRIPTION OF THE PREFERRED EMBODIMENT:

An approximately-sized segment of extruded tubing of a poly-plastic material, as to be situated subterraneously, beneath ground/sidewalk surface level 60. Concealably retracted FIG. 2 at rest within said tubing 30, an accommodatingly-sized segment of netting 40 (alternatively, could be a perforated plastic sheet), exitable by outward extention FIG. 3 thru a formed, crush-proof, self-latchable surface door 31, to protectively encompass surface-stored collectable packages 42 at surface level 60.

Located innermost, just inside the free-end terminus of said coiled tubing 10, is the attachment of the inside-end of the netting 40 to an elastic recoil spring 20—the opposite end of 20 can be anchored in-place there by hook, adhesion, thermal-fusion, etc., to inside sidewall of free-end of tubing—or for applications in high-water-table-burial, if preferred, there is an off-the-shelf, sealable, snap-in end-cap tubing-component available. Said spring energy 20 is capable, on payout, of accumulating reciprocative stored energy adequate to recoil/return released netting 40 completely back "home" inside coiled tubing 10. "Off-the-shelf", all attached components are either formed/with, snap-in, or knotted, etc. Further, all parts are, by composition, protected against enviormental deterioration.

Ideal for, but not limited to protection of collectable waste, the monofilament woven mesh netting, for example, assembly 40 in FIG. 1 is, a loose, "over-bunched, bubble-like" (to discourage "diggers"), appropriate segment of netting (one embodiment, for example, uses: 0.010" threading, woven in 1" squares, net dimensions, including bubbling roughly 10'×10', tensioned by attachment to recoil spring energy 20 tending to affix netting in tight contiguous contact to surface level 60 at all contact—also discouraging "getting-to" packages 42 by dogs, kiddies, scavengers, etc. Actual snap-latchable door 31 is part of the same flexible poly-plastic material as tubing and is crush-resistant (i.e., vehicles crossing over curbing, etc., surface level 60). Embedment in weakened soils may require optional attachable support pads, positionable beneath door assembly and also under coiled tubing assembly 10.

I claim:

1. An apparatus for covering an article positioned at a road curb-side comprising:
   a hollow plastic housing having an opening adjacent ground level and also adjacent the curb-side, with the remainder of the housing disposed at a position below ground level;
   the housing having a cover which is pivotably attached to the housing opening; and
   a mesh netting extendably contained within the housing, the mesh netting having two ends, with the first end being attached to the housing, and the second end extendable out, over, then positionable underneath the weight of the article to be covered, to be held fast there that such extension of the mesh netting covers the article to prevent tampering therewith.

2. The apparatus as recited in claim 1 further comprising a retracting spring contained within the housing and attached to the first end of the mesh netting so that the mesh netting will automatically retract into the housing upon the second end being released from beneath the weight of the same article so covered.

* * * * *